United States Patent [19]

Libit

[11] 4,408,703
[45] Oct. 11, 1983

[54] DISPENSER COFFEE CAP

[76] Inventor: Sidney M. Libit, 441 Lakeside Ter., Glencoe, Ill. 60022

[21] Appl. No.: 263,144

[22] Filed: May 13, 1981

[51] Int. Cl.³ .................. G01F 11/18; G01F 11/26
[52] U.S. Cl. .................................... 222/284; 222/336; 222/361
[58] Field of Search ............... 222/284, 336, 361, 571

[56] References Cited

U.S. PATENT DOCUMENTS

| | | |
|---|---|---|
| 1,758,999 | 5/1930 | Carns . |
| 2,537,415 | 1/1951 | Loeb et al. ................ 222/361 X |
| 2,553,509 | 5/1951 | Altorfer . |
| 3,056,532 | 10/1962 | Germano . |
| 3,227,324 | 1/1966 | Tessin ..................... 222/361 X |
| 3,347,425 | 10/1967 | Beushausen et al. ........ 222/361 X |
| 3,458,092 | 7/1969 | McConnell . |

FOREIGN PATENT DOCUMENTS 252500 2/1967 Austria .

Primary Examiner—Joseph J. Rolla
Assistant Examiner—Frederick R. Handren
Attorney, Agent, or Firm—Hill, Van Santen, Steadman & Simpson

[57] ABSTRACT

A measuring and dispensing closure for containers of granular material employs a slide element slidable in and out of a container cap top. The slide element has a chute element positioned thereon defining a series of trap spaces into which granular material is passed from the container when the slide element is in its retracted position. When the container is turned upside down and the slide element is moved outwardly relative to the cap top, the chute chamber passes out from a discharge opening formed on the cap top to expose the trap spaces to atmosphere for dispensing the granular material. Communication between the interior of the container and the trap spaces during dispensing is prevented by a planar ledge portion formed on the cap top and underlying the space beneath the chute chamber member. The slide element is preferably formed of plastic molded material and also includes a biasing member to provide a return force against outward movement of the slide. The series of trap spaces are positioned in sequence so that the user may dispense all or only a portion of the material collected by the chute element, depending upon the amount of outward extension of the slide.

28 Claims, 13 Drawing Figures

DISPENSER COFFEE CAP

BACKGROUND OF THE INVENTION

1. Field of the Invention

This invention relates to a hand-operated cap dispenser for dispensing small amounts of commodities of various kinds from a capped container.

2. The Prior Art

Typically commodities, such as coffee, tea, powdered dairy products, and other substances in granular or powdered form, have been contained and distributed in cans, jars, and other containers having covers which must be removed to allow the user access to the contents. The user removes a portion of the contents, usually with a spoon, and then replaces the cover to keep the unused contents fresh and in air-tight condition to prevent loss of flavor. Among the disadvantages with this type of assembly are that continuous opening and closing of the container permits the contents to go stale sooner and requires the use of spoons or other independent measuring devices in the dispensing of the product which are not always conveniently near and the handling of which requires a degree of skill or dexterity.

The cap dispenser elements by which a predetermined quantity of coffee, tea, or the like can be discharged from a container while its cap is closed are known in the art. For example, U.S. Pat. No. 3,056,532 discloses a dispenser slide located in a container cap having a cavity for receiving a predetermined amount of contents of the container and adapted to discharge the material in the cavity when the slide is moved outward from the profile of the cap. A similar arrangement is shown in U.S. Pat. No. 3,458,092. The drawbacks, generally, with such previously known cap dispenser elements are that the assemblies require a complicated and hence expensive construction and/or that a unitary collecting cavity is used which requires the amount dispensed to be no less than the full volume of the cavity. Further, operation of these heretofore known cap dispenser elements often necessitates the use of both hands, one to hold the container and the other to operate a grip member located at the leading edge of the cap slide element, and is therefore difficult to manipulate.

The present invention is directed to a relatively inexpensive, plastic molded construction for a cap dispenser which is designed to permit the user to operate a dispenser slide with a finger of the hand holding the container. In addition, the slide element is arranged with a plurality of separate trap chute spaces to collect material so that the operator can readily discharge an entire volume of material collected or a fraction thereof.

SUMMARY OF THE INVENTION

A measuring and dispensing closure for containers of granular material is constructed from plastic-molded material and serves as a container cap which is not intended to be removed from the container body in order to empty the contents of the container. The dispensing closure utilizes a slide element which fits within the profile of the cap and is reciprocatable along a top portion of the cap. The cap top portion is formed with a laterally facing discharge opening leading from a collection space, contained in the top portion and which is in direct communication with the interior of the container. The slide element comprises an upper surface platform portion which serves to carry underneath a chute or trap chamber element and a biasing means. The chute element comprises a series of longitudinally spaced lateral partition walls which define a series of vertically open trap spaces therebetween. The chute element passes into and out the discharge opening, during movement of the slide element, to collect and dispense material from the container as the trap spaces pass out of the discharge opening, they are blocked from communication with the container interior by a planar ledge portion formed on the cap, but open at the other vertical end through an opening formed in the platform surface for dispensing. By use of the lateral partition walls, the chute element rakes the container material out the discharge opening in waves which enables the user to dispense the trap spaces one at a time and less than all the material collected in the chute element, if desired.

The biasing means formed on the slide element place a return force on the slide element during outward movement thereof. In one embodiment of the invention, the biasing means comprises a wave spring member fixed at one end to a vertically extending support wall formed on the slide element platform and at its other end to a vertical wall formed in the cap top portion behind the discharge opening. In another embodiment, the biasing means comprises a resilient hollow ring member which extends into the collection space and carries a pair of link members extending laterally outward from substantially diametrically opposed surfaces of the ring. The link members pivotally engage at their corresponding outer ends with vertical pin means located in the collection space, such that the link members move in over-center relation to the ring during outward movement of the slide element. This over-center action causes compression of the ring, such that the slide element is biased in a return stroke until just before full outward extension of the chute element whereupon the link members flip over causing re-expansion of the ring and notifying the operator that all the trap spaces have cleared the discharge opening.

In operation, the container is turned upside down so that the container contents flow to the collection space in the cap and enter the trap spaces in the chute element. The user then moves the slide element outward with the forefingers of the free hand or with the fingers of the hand holding the container for dispensing.

DESCRIPTION OF THE PREFERRED EMBODIMENTS

Figure 1:
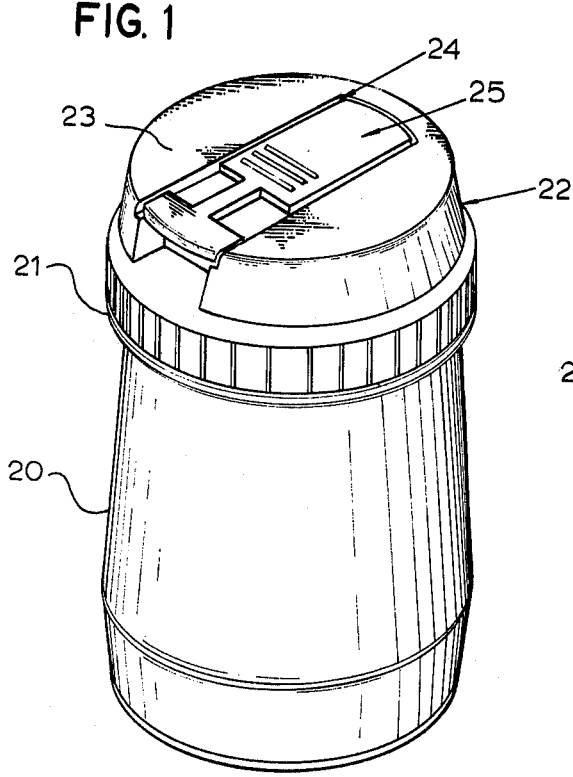
FIG. 1 is a perspective view illustrating a first embodiment of a dispensing closure constructed in accordance with the present invention on a jar.

FIGS. 1-7 illustrate a first embodiment of a dispensing closure constructed in accordance with the present invention. With reference to FIG. 1, a jar or container 20 is provided of any desired size and configuration with a circular threaded portion 21 for the reception of a screw cap 22 having threads for engagement with the threads 21 of the jar. The container cap 22 may be removed from the jar 20; however, in accordance with the present invention, removal of the container cap is not necessary for dispensing of the contents of the container. The container preferably holds commodities of various kinds in granular or powdered form, such as coffee, tea, or sugar, which can be readily dispensed. The container cap 22 is formed with a centrally raised top portion 23 which is spaced from the top of the jar 20 and is provided with an elongated cut-away opening 24. The opening 24 carries a measuring and dispensing slide element 25 which fits within the profile of the cap.

Figure 2:
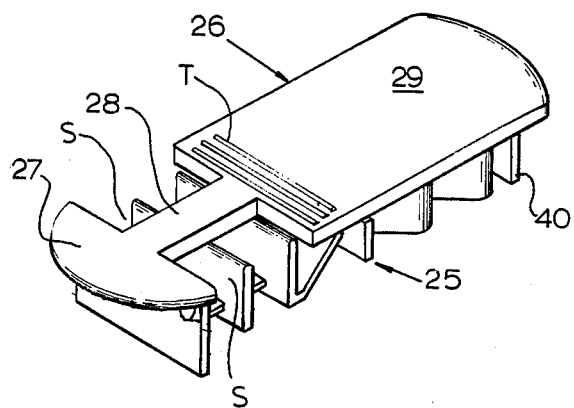
FIG. 2 is a perspective view depicting the slide element for the dispensing closure of FIG. 1.
Figure 3:
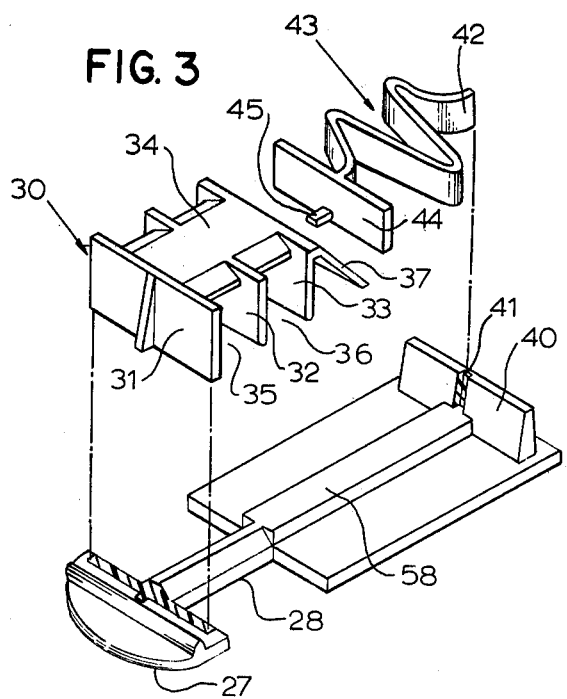
FIG. 3 is a perspective assembly view illustrating the components of the slide element of FIG. 2.

The slide element 25 is illustrated in FIGS. 2 and 3. The slide element has an upper generally planar platform surface 26 having a lip edge portion 27 connected via a longitudinally directed wall strip 28 with a large trailing wall portion 29. A textured area T formed by laterally extending ridges is formed adjacent the forward end of the trailing portion 29. Formed intermediately along the platform surface 26 is an opening S located on opposed lateral sides of the connecting strip 28.

Positioned beneath the lip portion 27 and connecting strip 28 is a chute member 30 comprising a plurality of longitudinally spaced lateral partitions 31, 32, and 33. The front wall member 31 is connected by an adhesive along the trailing edge of the lip portion 27. Connected to the front wall and extending backwardly therefrom is a rib wall 34 which serves to join together the walls 31, 32, and 33. The intermediate and trailing walls 32 and 33 have vertical heights less than the height of the front wall 31 so as to define a recessed plane or gap between the upper edges of the wall members 32 and 33 and the upper edge of the front wall 31. Vertically open spaces 35 and 36 are defined between the front wall 31 and the intermediate wall 32 and the intermediate wall and the trailing wall 33, respectively, to serve as trap chambers into which granular material is collected and from which the material is dispensed in operation of the slide element 25. The trailing wall portion 33 is formed with a diagonally extending lip edge member 37 which serves as a stop against a wall member formed in the cap top as will be described further below.

Extending downwardly from adjacent a rear edge of the trailing upper surface portion 29 is a support wall member 40 which extends laterally across the surface wall 28. The support wall 40 is formed with a central vertically extending recess 41 for receiving a free end 42 of a wave spring member 43 in fixed connection via an adhesive. The spring 43 has undulating wave segments defined in a lateral plane and is free to compress and expand resiliently in the longitudinal direction. The front end of the spring 43 is connected to a laterally extending abutment wall 44 formed with a pin projection 45 extending longitudinally forwardly thereof for reasons further described below.

Figure 4:
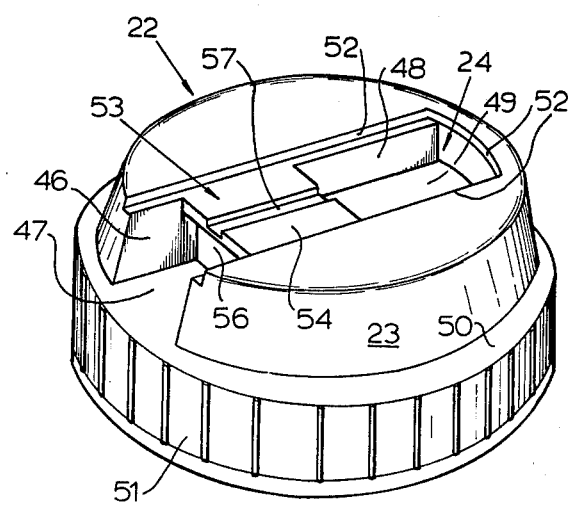
FIG. 4 is a perspective view of the closure cap of FIG. 1 with the slide element removed.
Figure 5:
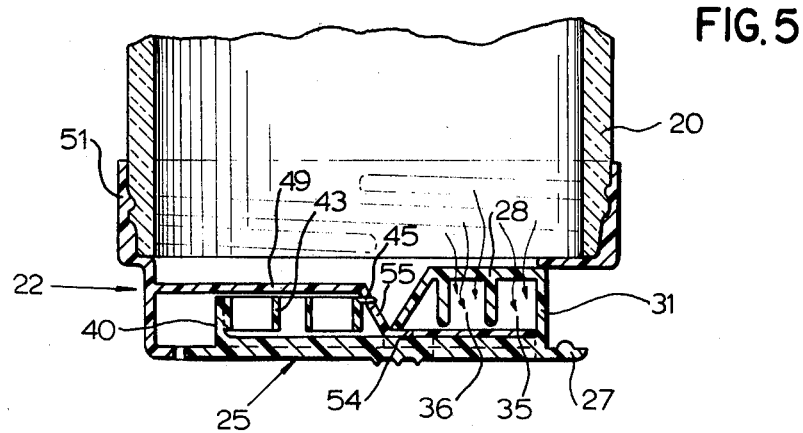
FIG. 5 is a cross-sectional side elevational view showing filling of the dispensing closure of FIG. 1 when the slide element is in its closed position.
Figure 6:
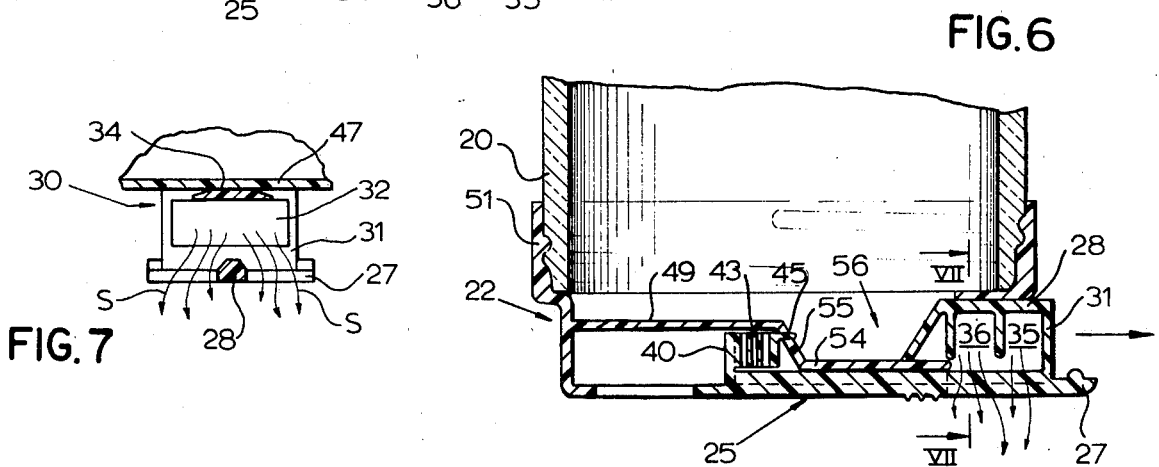
FIG. 6 is a cross-sectional side elevational view illustrating the dispensing closure of FIG. 1 during discharge when the slide element is in its fully extended outward position.

The cap top is constructed to receive the slide element 25 within its contour in slidable relation. With reference to FIGS. 4-6, the cut-away space 24 extends diametrically across the cap top 23 and is formed at a front end by a pair of sidewalls 46 and a planar ledge portion 47 and at the rear end by another pair of sidewalls 48 and a planar bottom surface portion 49. The front and rear surfaces 47 and 49 also serve as part of an outer edge wall 50 formed on a cap skirt portion 51 containing the cap threads and underlying the cap top portion 23. The cut-away opening 24 is bounded along three sides of its perimeter by a guideway edge 52 formed in the roof of the cap top 23. Underlying the guideway edge 52 between the front and rear surface portions 47 and 49 is a housing wall means 53 having a roof wall 54 and a vertically extending back wall 55 which defines inwardly of the cap top 23 a collection space 56. Beneath the forward edge of the roof wall 54 is a discharge opening through which the chute member 30 reciprocates during operation of the slide element 25. The roof wall 54 is formed with a longitudinally extending guide recess 57 for functionally receiving a depending guide surface 58 formed on the undersurface of the upper surface trailing portion 29. The back wall 55 has an opening to receive the pin projection 45 connected with the spring member 43.

When assembled, the slide element 25 is positioned within the cut-away opening 24. In its closed position, the chute member is contained within the collection space 56 such that the chute front wall 31 sealingly abuts against the leading edge of the roof wall 54 and the trailing edge of the stop wall member 37 engages with a corresponding leading edge of the chute housing back wall 55. On the other side of the back wall 55 is positioned the spring member 43, such that the pin projection 45 is engaged within the back wall opening and the undulations in the spring 43 resiliently react against the support wall 40 to bias the slide element rearward to its closed position. When the container 20 is turned upside down by the user, the granular material contained therein flows into the collection space 56 and enters the trap chambers 35 and 36 formed in the chute member 30.

Figure 7:
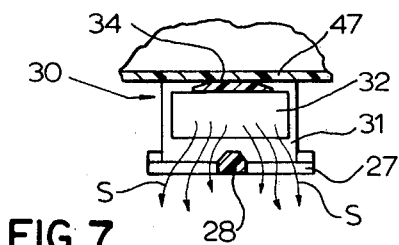
FIG. 7 is a fragmentary cross-sectional side elevational view taken along the lines VII—VII of FIG. 6.

To dispense the granular material, the thumb of the hand holding the container can be applied to the textured area T formed on the upper surface of the slide element to force the slide member outwardly against the bias of the spring 43 or the user can grip the slide lip portion 27 with the forefingers of his free hand. By using the thumb upon the platform surface 29, however, easier and quicker manipulation of the slide element for dispensing is possible. The chute walls 32 and 33 rake the collected material contained in the trap spaces 35 and 36 out from the housing wall means 53 such that the trap spaces 35 and 36 are exposed in sequence. The ledge portion 47 blocks off communication between the interior of the container and the chute trap spaces as the chute element 30 is moved outward from the cap top discharge opening. Granular material is free to fall from the trap spaces through the opening S as shown in FIG. 7. If the user wishes to dispense the full contents of the chute, then the slide is extended to its extreme outward position as shown in FIG. 6, so that both trap chambers 35 and 36 may empty their contents. If the user wishes to dispense less than the full amount of collected material, extension of the slide element can be halted before the trailing collection cavity 36 is brought out from under the roof wall 54. By virtue of this inventive dispensing cap construction, the user is able to dispense the full contents of the container 20 in a controlled, measured fashion, unlike when granular materials are dispensed with a teaspoon inserted in the container, since the jar 20 can be tipped and shaken to pass the last bit of granular material into the slide member chute chambers.

Figure 8:
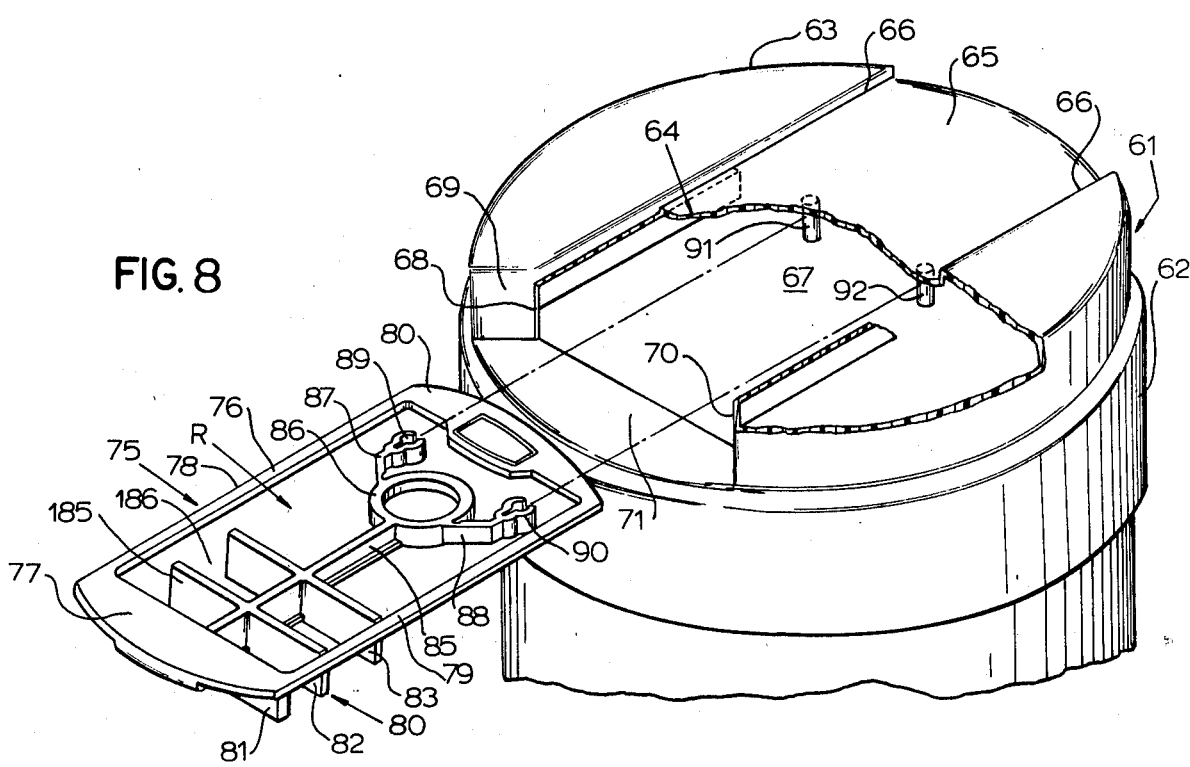
FIG. 8 is a perspective assembly view with broken-away upper surfaces illustrating a second embodiment dispenser closure constructed in accordance with the present invention.
Figure 9:
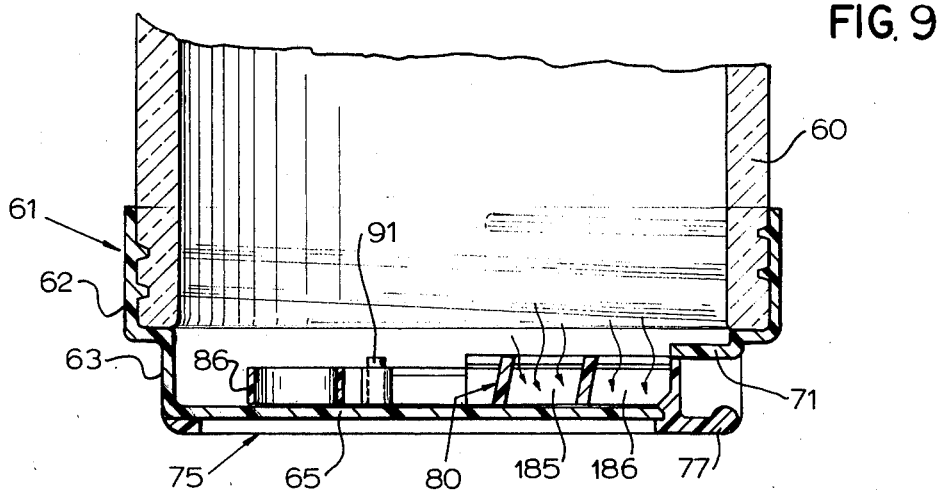
FIG. 9 is a cross-sectional side elevational view showing filling of the dispensing closure of FIG. 8 when the slide element is in its closed position.
Figure 10:
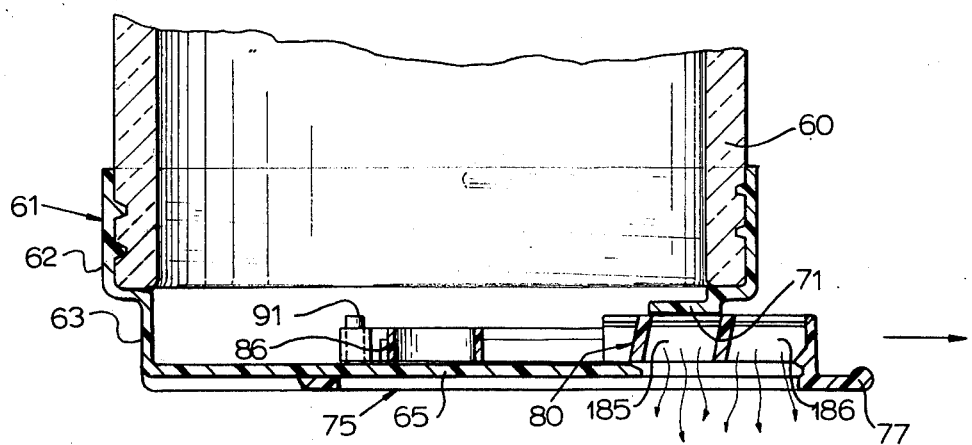
FIG. 10 is a cross-sectional side elevational view illustrating the dispensing closure of FIG. 8 during discharge when the slide element is in its fully extended outward position.

A second embodiment of the measuring and dispensing construction in accordance with the present invention is illustrated in FIGS. 8-13. With reference to FIGS. 8-10, a jar or container 60 for granular or powdered material is fitted with a screw cap 61, which, in the manner of the first embodiment, has screw threads for engagement with corresponding threads on the jar mouth. The container cap 61 is formed with a lower end skirt portion 62 having the screw threads formed on its interior surface and a central top portion 63. The cap top portion 63 is formed with a diametrically extending housing wall means 64, comprising a generally planar wall segment 65 bounded on laterally opposed sides by guideway edge surfaces 66. Beneath the wall 65 is defined a collection space 67 in the form of a recess in the cap top which communicates directly with the interior of the container. A laterally facing discharge opening 68 is formed in the cap top leading from the collection space 67. Opposing converging sidewalls 69 and 70 lead to the discharge opening 68 and a planar ledge portion 71 extends between an outer edge of the cap and the bottom end of the opening 68.

A measuring and dispensing slide element 75 is provided for slidable movement along the housing wall means 64 of the cap top. The slide element 75 has an upper platform frame 76 formed with a forward lip portion 77 followed by two sidewall edge strips 78 and 79 running longitudinally rearward of the lip portion 77 and connected together at their rearward ends by a generally planar back wall surface 80. The platform 76 is thus formed with an intermediate opening R. The side edge strips 78 and 79 are laterally spaced apart to fit between the guideway surfaces 65 and 66 in tight-fit, but slidable, relation. The upper frame 76 is slidably supported on the wall surface 65. As in the case of the first embodiment, the upper frame 76 may be filled out with material to define a large area trailing surface portion with a textured thumb receiving surface for movement of the slide element 75; however, for purposes of illustration, a user would move the slide element 75 back and forth in this embodiment by grasping the lip portion 77.

Positioned beneath the upper frame 76 is a chute member 80 formed in the manner of the first embodiment with a lateral front wall 81 followed by an intermediate and back partition walls 82 and 83, respectively, mounted along a central rib wall 84. Between the upper edges of the partitions 82 and 83 and the undersurface of the platform 76 is defined a gap plane for receiving therein the wall strip 65, such that the chute element 80 is spaced through the discharge opening 68 and into the collection space 67 in operation of the slide element 75. The wall members 81-83 serve to define trap spaces 185 and 186 therebetween to serve as trap chambers into which granular material is collected and from which the material is dispensed in operation of the slide element 75.

A longitudinally extending arm member 85, which is an extension of the rib wall 84, runs rearwardly of the trailing chute wall 83 to support a biasing means comprising a flexible, plastic ring member 86 and a pair of link members 87 and 88 extending outwardly from substantially diametrically opposed surfaces of the ring 86. The link members are formed at their outer free ends with corresponding semi-circular grip pocket members 89 and 90, which pivotally engage corresponding vertical pin elements 91 and 92 extending downwardly from the undersurface of the top portion wall 65.

Operation and attachment of the slide element 75 in relation to the cap top 63 is illustrated in FIGS. 9 and 10. The slide 75 fits into the contour of the cap top with the platform surface 76 on the exterior side of the wall 65 and the chute element 80 and biasing means underneath the wall 65 in the collection space 67. When the container 60 is turned upside down, the granular material contained therein flows into the collection space 67 and enters the chute trap chambers 185 and 186. To dispense the granular material, the user grips the lip portion 77 of the slide element 75 and pulls the slide outwardly. As each of the trap spaces 185 and 186 are passed out from the discharge opening 68, granular material collected by the chute 80 is free to fall from the chambers 185 and 186 through the platform opening R. The user may dispense both chute cavities 185 and 186 or smaller amounts of granular material as in accordance with the first embodiment. Communication between the collection spaces 185 and 185 and the interior of the container 60 is precluded during dispensing by virtue of the inward extension of the ledge wall 71 which underlies the trap spaces as they pass out from the discharge opening.

Figure 11:
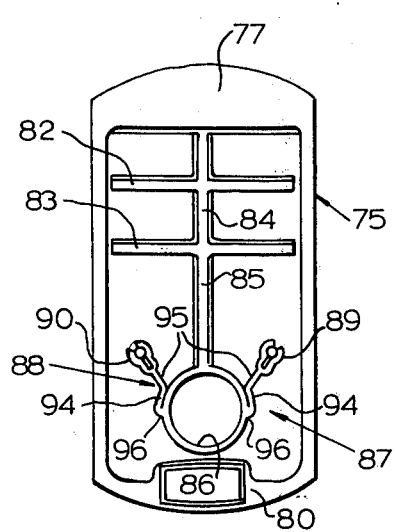
FIG. 11 is a fragmentary plan view illustrating the slide element for the dispenser closure of FIG. 8 in its fully retracted position.
Figure 12:
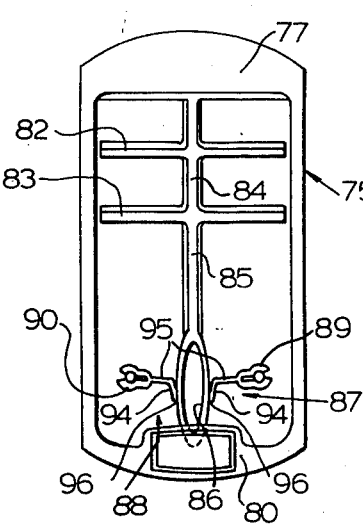
FIG. 12 is a fragmentary plan view of the slide element of FIG. 11 during movement to its extended outward position.
Figure 13:
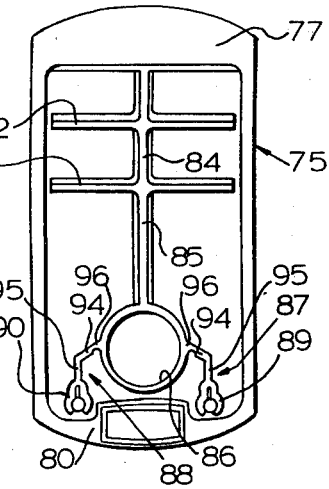
FIG. 13 is a fragmentary plan view of the slide element of FIG. 11 in its fully extended outward position.

Operation of the biasing means provided in this embodiment is illustrated in FIGS. 11-13. Each link member 87 and 88 is formed with connected first 94 and second 95 arm portions defining therebetween an obtuse angle. The inner, first arm portion 94 is connected at a corresponding end with the ring member 86 by a segment 96 of relatively reduced thickness, which acts as a hinge section permitting the link member to rotate about the surface of the ring 86. The grip elements 89 and 90 are formed at the outer free ends of the corresponding second arm portions 95. During movement of the slide element 75, the link members 87 and 88 move in over-center relation to the ring 86. When the slide element 75 is in its fully retracted, closed position, as shown in FIG. 11, the link members 87 and 88 extend forwardly of the ring 86 and the hollow ring 86 assumes its normal circular shape. During dispensing, as the slide element 75 is moved outward relative to the cap top 63, as shown in FIG. 12, the outer, second arm portions 95 are drawn radially inward against the ring 86. This movement causes compression of the ring 86 into a flexed oval shape, which produces a reaction force resiliently biasing the slide element 75 back inward towards its closed position in the cap top. At this stage of slide element movement, the user may utilize the return bias force to operate the slide element 75 quickly and dispense less than full chute collected quantities of granular material. When the slide element 75 is moved further outwardly such that all the chute element trap spaces 185 and 186 become exposed out from the discharge opening 68, the link members 87 and 88 pass through an over-center movement so as to end up extending rearwardly relative to the ring member 86, as shown in FIG. 13. The ring 86 is no longer compressed and assumes its normal circular shape, such that the bias force created by the link members and ring is lost. The user is able to feel this loss of biasing force which indicates to him when the extreme outward position of the slide element 75 has been reached in all chute trap chambers are being dispensed. To return the slide element into the cap top 63, the operator moves the lip portion 77 rearwardly back towards the cap top 63, which causes the ring 86 to pass through another compression stage and, hence, requires the user to overcome the bias force that this movement creates.

In accordance with the preferred embodiments, the slide element of the present invention is made of lightweight, inexpensive plastic-molded material. However, other suitable materials for the inventive assembly are within the contemplation of the present invention. As disclosed herein, the chute member partition walls are spaced equally apart from one another. The operator has the option of dispensing the whole or one-half the total volume of granular material collected in the chute element. However, it is further within the contemplation of the present invention to utilize a plurality of chute lateral walls defining more than two collection cavities and for these cavities to define volumes varied relative to one another.

Although various minor modifications may be suggested by those versed in the art, It should be understood that I wish to embody within the scope of the patent warranted hereon all such modifications as reasonably and properly come within the scope of my contribution to the art.

I claim as my invention:

1. Apparatus for dispensing a predetermined amount of material from a container comprising a cap attachable to said container and having a top portion, said top portion comprising housing wall means, for defining a collection space communicating with the interior of said container and a laterally facing discharge opening leading from said collection space, and a planar ledge portion between an outer edge of said top portion and a bottom edge of said discharge opening, and a slide element comprising a generally planar top wall having an opening formed intermediately thereof and carrying underneath a chute element and a biasing means, said chute element comprising a series of longitudinally spaced lateral wall surfaces defining therebetween a corresponding series of vertically open trap chambers facing said top wall opening therebeneath across a gap, said biasing means comprising a resilient member which is compressed during outward movement of said slide element for providing a return force upon said slide element, said slide element top wall lying on said housing wall means for slidable movement thereover such that said chute element trap chambers pass into and out of said discharge opening and a portion of said housing wall means fits into said gap, whereby said trap chambers are contained in said collection space when said slide element is in its closed position and pass over said ledge portion during outward movement of said slide element.

2. The apparatus of claim 1, wherein said slide element is made of molded plastic material.

3. The apparatus of claim 1, wherein said housing wall means comprises a recessed, flat wall strip for slidably containing said slide element top wall.

4. The apparatus of claim 1, wherein said biasing means comprises an overcenter spring means integrally molded with said slide element.

5. The apparatus of claim 4, wherein said biasing means comprises a support arm extending rearward of said chute element, a resilient hollow ring member carried by the trailing end of said support arm, a pair of link members extending laterally outwardly from substantially diametrically opposed surfaces of said ring member and each having a semi-circular grip member at an outer free end thereof, and a pair of laterally spaced pin means extending downwardly from said wall strip in said collection space for corresponding respective engagement by said grip members, whereby said link members are in over-center relation to said ring member.

6. The apparatus of claim 5, wherein said each of link members comprises first and second connected arm portions defining therebetween an obtuse angle, each said first arm portion being connected to said ring member with a hinge section and each said second arm portion carrying said corresponding grip member.

7. The apparatus of claim 6, wherein each said hinge section comprises a relatively thin segment of said corresponding first arm portion.

8. The apparatus of claim 5, wherein said pin means lie forwardly of said ring member when said slide element is in its closed position and lie rearwardly of said ring member when said slide element is in its outermost position, said link members compressing said ring member during movement of said slide element between its closed and outermost positions.

9. The apparatus of claim 1, wherein said slide element fits within the contour of said top portion.

10. The apparatus of claim 3, wherein said top portion has wall structure defining a trough on the opposed side of said housing wall means from said discharge opening between a vertical back wall of said housing wall means and said outer edge of said top portion, said biasing means being positioned in said trough and comprising a wave spring member fixed at one end to a vertically extending support wall formed on said slide element top wall and at its other end to said back wall.

11. The apparatus of claim 10, wherein said other end of said wave spring member is formed with a lateral wall surface for abutting against said back wall, said lateral wall surface having a pin projecting forwardly therefrom and received in a corresponding hole formed in said back wall.

12. The apparatus of claim 10, wherein said slide element is made of molded plastic material.

13. The apparatus of claim 1, wherein said top wall has a textured surface area.

14. The apparatus of claim 3, wherein said slide element top wall is formed with a guide rib member running longitudinally thereof for corresponding slidable receipt in a groove formed in said wall strip.

15. The apparatus of claim 1, wherein said trap chambers define volumes equal with one another.

16. Apparatus for dispensing a predetermined amount of material from a container comprising a cap attachable to said container and having a top portion, said top portion having a laterally facing discharge opening leading from a collection space defined in said top portion in direct communication with the interior of said container, and a planar ledge portion between an outer edge of said top portion and a bottom edge of said discharge opening, and a slide element reciprocable along said top portion comprising a chute element positioned for passage into and out of said discharge opening, said slide element comprising a planar platform wall carrying said chute element and which is slidably received along an upper surface of said top portion said chute element including a series of longitudinally spaced lateral wall surfaces defining therebetween a corresponding series of trap spaces, such that said trap spaces are contained in said collection space when said slide element is in its closed position and pass over said ledge portion during outward movement of said slide element, said platform wall having an opening formed intermediately thereof directly over said trap spaces.

17. The apparatus of claim 16, wherein said slide element further comprises biasing means formed thereon for providing a bias return force to said slide element during outward movement thereof.

18. The apparatus of claim 17, wherein said slide element is made of plastic molded material.

19. The apparatus of claim 17, wherein said biasing means comprises an overcenter spring means integrally molded with said slide element.

20. The apparatus of claim 17, wherein said biasing means comprises a wave spring member fixed at one end to a vertically extending support wall formed on said slide element and at its other end to a substantially vertical wall formed in said top portion behind said discharge opening.

21. The apparatus of claim 16, wherein said platform wall has a textured surface area.

22. The apparatus of claim 19, wherein said biasing means comprises a resilient hollow ring member carried by said slide element and a pair of link members extending laterally outwardly from substantially diametrically opposed surfaces of said ring member, said link members pivotally engaged at their corresponding outer ends with vertical pin means formed on said top portion, whereby said link members move simultaneously in over-center relation to said ring member during outward movement of said slide element.

23. The apparatus of claim 22, wherein said link members compress said ring member during outward movement of said slide element.

24. The apparatus of claim 22, wherein each of said link members comprises first and second connected arm portions defining therebetween an obtuse angle and each of said first arm portions joins at a hinge section with said ring member.

25. The apparatus of claim 24, wherein each said hinge section comprises a segment of relatively reduced thickness on said corresponding first arm portion.

26. The apparatus of claim 25, wherein said slide element is made of plastic molded material.

27. The apparatus of claim 22, wherein said pin means extend within said collection space.

28. The apparatus of claim 16, wherein said trap spaces define volumes equal with one another.

* * * * *